(12) United States Patent
Zhao et al.

(10) Patent No.: US 9,229,278 B2
(45) Date of Patent: *Jan. 5, 2016

(54) LIQUID CRYSTAL DEVICE AND THE MANUFACTURING METHOD THEREOF

(71) Applicant: Shenzhen China Star Optoelectronics Technology Co., Ltd., Shenzhen, Guangdong (CN)

(72) Inventors: Yong Zhao, Shenzhen (CN); Xin Zhang, Shenzhen (CN); Shui-Chih Lien, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 121 days.

This patent is subject to a terminal disclaimer.

(21) Appl. No.: 14/234,388

(22) PCT Filed: Jan. 8, 2014

(86) PCT No.: PCT/CN2014/070332
§ 371 (c)(1),
(2) Date: Jan. 22, 2014

(87) PCT Pub. No.: WO2015/100765
PCT Pub. Date: Jul. 9, 2015

(65) Prior Publication Data
US 2015/0219968 A1 Aug. 6, 2015

(30) Foreign Application Priority Data
Dec. 31, 2013 (CN) .......................... 2013 1 0747979

(51) Int. Cl.
*G02F 1/1337* (2006.01)
*G02F 1/1339* (2006.01)
*G02F 1/1362* (2006.01)
*G02F 1/1368* (2006.01)

(52) U.S. Cl.
CPC ........ *G02F 1/133753* (2013.01); *G02F 1/1337* (2013.01); *G02F 1/1339* (2013.01); *G02F 1/1368* (2013.01); *G02F 1/133788* (2013.01); *G02F 1/136209* (2013.01); *G02F 1/136286* (2013.01); *G02F 2001/133757* (2013.01); *G02F 2001/136222* (2013.01)

(58) Field of Classification Search
CPC ............ G02F 1/1337; G02F 1/133711; G02F 1/134363; G02F 1/133788; G02F 1/133753; G02F 1/141
USPC .......................................... 349/123, 124, 128
See application file for complete search history.

(56) References Cited

U.S. PATENT DOCUMENTS

2015/0009442 A1* 1/2015 Lee et al. ........................ 349/43
2015/0185514 A1* 7/2015 Zhao et al. ..................... 349/123
2015/0185561 A1* 7/2015 Zhao et al. ..................... 349/123

*Primary Examiner* — Mike Qi
(74) *Attorney, Agent, or Firm* — Andrew C. Cheng (57) ABSTRACT

A liquid crystal device is disclosed. The liquid crystal device includes a TFT array substrate, a CF substrate, and a liquid crystal layer. The TFT array substrate includes a first electrode layer and a first alignment layer covering the first electrode layer. A color CF layer is formed between a glass substrate and a passivation layer of the TFT array substrate. The TFT array substrate further includes a black matrix and a photo spacer arranged thereon. The CF substrate includes a second electrode layer and a second alignment layer covering the second electrode layer. The liquid crystal layer is arranged between the first alignment layer and the second alignment layer. In addition, a manufacturing method of the liquid crystal device is disclosed. In this way, the liquid crystal devices have good alignment effects, and the color shift issues at wide viewing angle and the aperture rate are enhanced.

13 Claims, 10 Drawing Sheets

LIQUID CRYSTAL DEVICE AND THE MANUFACTURING METHOD THEREOF

This application claims priority to China Patent Application No. 201310747979.4 filed on Dec. 31, 2013 entitled, "LIQUID CRYSTAL DEVICE AND THE MANUFACTURING METHOD THEREOF," all of the disclosures of which are incorporated herein by reference in their entirety.

This application also related to National Stage Application Ser. No. 14/234,385, submitted on the same date, entitled, "ALIGNMENT METHOD FOR LIQUID CRYSTAL PANEL AND THE CORRESPONDING LIQUID CRYSTAL DEVICE" assigned to the same assignee.

This application also related to National Stage Application Ser. No. 14/234,386, submitted on the same date, entitled, "LIQUID CRYSTAL DEVICE AND THE MANUFACTURING METHOD THEREOF" assigned to the same assignee.

This application also related to National Stage Application Ser. No. 14/234,387, submitted on the same date, entitled, "LIQUID CRYSTAL DEVICE AND THE MANUFACTURING METHOD THEREOF" assigned to the same assignee.

BACKGROUND OF THE INVENTION

1. Field of the Invention

Embodiments of the present disclosure relate to thin film transistor liquid crystal display (TFT-LCD) manufacturing technology, and more particularly to a liquid crystal device and the manufacturing method thereof.

2. Discussion of the Related Art

Figure 1:
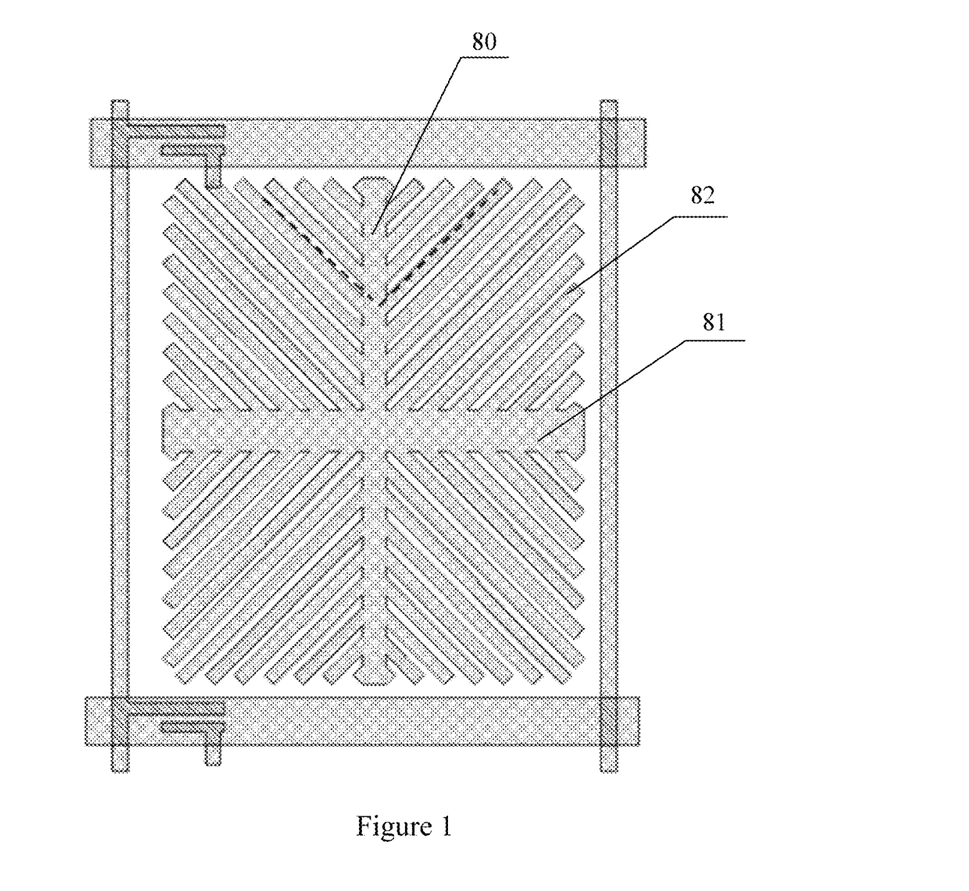
FIG. 1 is a schematic view of one typical pixel electrode of PSVA LCD.

FIG. 1 is a schematic view of a one typical pixel electrode of Polymer Stabilization Vertical-Alignment (PSVA) LCD. For the typical PSVA LCD, the pixel electrode is designed to have a shape similar to a Chinese character "米", including a vertical branch 80, a horizontal branch 81, and a plurality of branches 82 forming an angle equaling to ±45 or ±135 degrees with x axis. The vertical branch 80 and the horizontal branch 81 divided the dimension of the pixel into four areas, and each of the area is spread with the branches forming the angle equaling to 45 degrees with the x axis.

Figure 2:
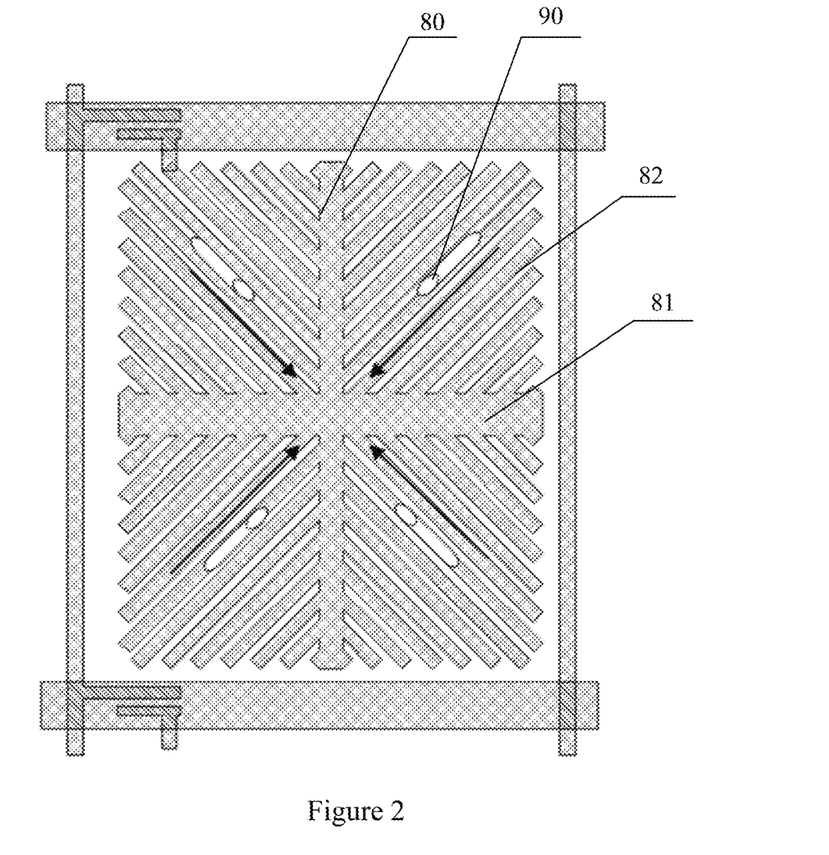
FIG. 2 is a schematic view showing the reversed liquid crystal after the pixel electrode of FIG. 1 is applied with the voltage.

FIG. 2 is a schematic view showing the upside-down liquid crystal of the pixel electrode of FIG. 1 after being applied the voltage. FIG. 2 shows that the liquid crystal molecules 90 incline from an outside to inside of the pixel electrode after being applied the voltage equaling to 4V. The inclining angle is along the direction of the notch, that is, the direction of the branch 82 as indicated by the arrow. The inclining angle of the liquid crystal for the four areas are respectively ±45 or ±135 degrees, and the inclining angle directs at a central area. As shown in FIG. 2, the included angle formed by the liquid crystal and the x axis are respectively −135 degrees for the first dimension, −45 degrees for the second dimension, 45 degrees for the third dimension, and 135 degrees for the fourth dimension. Currently, the PSVA manufacturing process usually designs the pixel electrode to have the shape similar to the Chinese character "米" to control the alignment of the liquid crystal molecules so as to enhance the color shift issue at wide viewing angle.

However, this solution strongly depends on the design of pixel electrode, which may result in light and dark strips. As such, the transmission rate of light beams is reduced, and the display performance and brightness may be affected.

SUMMARY

In order to overcome the above problem, a liquid crystal device and the manufacturing method thereof are provided. The liquid crystal device has good alignment performance, and the color shift issue at wide viewing angle is solved and the aperture rate is enhanced.

In one aspect, a liquid crystal device includes: a TFT array substrate comprising a first electrode layer and a first alignment layer covering the first electrode layer, a color film (CF) layer is formed between a glass substrate and a passivation layer of the TFT array substrate, and the TFT array substrate comprises a black matrix and a photo spacer arranged thereon; a CF substrate comprising a second electrode layer and a second alignment layer covering the second electrode layer; a liquid crystal layer arranged between the first alignment layer of the TFT array substrate and the second alignment layer of the CF substrate; wherein both of the first alignment layer and the second alignment layer are divided into at least one subarea, and each of the subareas is divided into a plurality of alignment areas, and a predetermined alignment direction of the alignment area of the first alignment layer is vertical to that of the second alignment layer; and each alignment areas of the first alignment layer and the second alignment layer are radiated by polarized beams with different directions, polarized directions of the polarized beams radiating on each of the alignment areas adapts to the alignment directions such that alignment films having the predetermined alignment direction corresponding to each of the alignment area are formed on the first alignment layer and the second alignment layer.

Wherein the TFT array substrate further comprises the glass substrate, a gate line, a semiconductor layer, and a data line.

Wherein the black matrix is arranged above the passivation layer of the TFT array substrate, or is arranged above the glass substrate of the TFT array substrate and below the gate line, or is arranged above the glass substrate of the TFT array substrate and arranged on two lateral sides of the gate line, or is arranged between the CF layer and the data line of the TFT array substrate.

Wherein the photo spacer is arranged above the black matrix, or is arranged above the passivation layer of the TFT array substrate.

Wherein the CF layer is made by any one of bone glue, acrylic, polyimide, and polyester.

Wherein each subareas is divided into four alignment areas by two separating lines vertical to each other, and at least two out of the four alignment areas have different alignment directions.

Wherein the first electrode layer is a pixel electrode layer, and the second electrical layer is a common electrode layer.

In another aspect, a liquid crystal device includes: a TFT array substrate comprising a first electrode layer and a first alignment layer covering the first electrode layer, a color film (CF) layer is formed between a glass substrate and a passivation layer of the TFT array substrate, and the TFT array substrate comprises a black matrix and a photo spacer arranged thereon; a CF substrate comprising a second electrode layer and a second alignment layer covering the second electrode layer; a liquid crystal layer arranged between the first alignment layer of the TFT array substrate and the second alignment layer of the CF substrate; wherein both of the first alignment layer and the second alignment layer are divided into at least one subarea, and each of the subareas is divided into a plurality of alignment areas, a predetermined alignment direction of the alignment area of the first alignment layer is vertical to that of the second alignment layer, each subareas is divided into four alignment areas by two separating lines vertical to each other, and at least two out of the four alignment areas have different alignment directions; and each alignment areas of the first alignment layer and the second alignment layer are radiated by polarized beams with different directions, polarized directions of the polarized beams radiating on each of the alignment areas adapts to the alignment directions such that alignment films having the predetermined alignment direction corresponding to each of the alignment area are formed on the first alignment layer and the second alignment layer.

In another aspect, a manufacturing method of liquid crystal devices includes: providing a TFT array substrate and a CF substrate, forming a CF layer between a glass substrate and a passivation layer of the TFT array substrate, coating polarization-beam-sensitive material on a first electrode layer of the TFT array substrate to form a first alignment layer, and coating polarization-beam-sensitive material on a second electrode layer of the CF substrate to form a second alignment layer; dividing both of the first alignment layer and the second alignment layer to at least one subarea, each of the subareas comprises a plurality of alignment areas, a predetermined alignment direction of the alignment area of the first alignment layer is vertical to the predetermined alignment direction of the corresponding alignment area of the second alignment layer; and radiating each alignment areas of the first alignment layer and the second alignment layer by polarized beams of different directions, and a polarized direction of the polarized beams radiating on each alignment areas adapts to the alignment direction so as to form the alignment films with predetermined alignment direction corresponding to each alignment areas; electrifying the first electrode layer of the TFT array substrate and the second electrode layer of the CF substrate so as to finish the alignment of the liquid crystal molecules; arranging a black matrix on the TFT array substrate; and arranging a photo spacer on the TFT array substrate.

Wherein the TFT array substrate further comprises the glass substrate, a gate line, a semiconductor layer, and a data line.

Wherein the black matrix is arranged above the passivation layer of the TFT array substrate, or is arranged above the glass substrate of the TFT array substrate and below a gate line, or is arranged above the glass substrate of the TFT array substrate and arranged on two lateral sides of the gate line, or is arranged between a CF layer and a data line of the TFT array substrate.

Wherein the photo spacer is arranged above the black matrix, or is arranged above the passivation layer of the TFT array substrate.

Wherein the CF layer is made by any one of bone glue, acrylic, polyimide, and polyester.

First, the polarized beams with different directions are adopted to radiate on the first alignment layer of the TFT array substrate and the second alignment layer of the CF substrate to form the alignment layer with specific alignment direction. As a result, it is not needed to design the pixel electrode, which avoids the light and dark strips caused by pixel electrodes. Also, the transmission rate of light beams is enhanced.

Second, the predetermined alignment direction of each alignment areas of each subareas of first alignment layer and that of the second alignment layer may be flexibly configured so as to achieve alignment for four areas of each pixel structure of the liquid crystal cells. At the same time, the color shift issue at wide viewing angle is enhanced.

Third, the black matrix arranged on the TFT array substrate is for preventing the TFT array substrate and the CF substrate from reduced aperture rate of the pixel areas due to dislocation.

Fourth, the photo spacer arranged on the TFT array substrate is for preventing the disclination line in the pixel areas due to the dislocation of the TFT array substrate and the CF substrate.

Fifth, by selecting appropriate CF layer material, the CF layer may operate as the insulation layer. As such, the insulation layer arranged on the up and down surfaces of the CF layer 18 may be omitted, which not only reduces the cost but also enhance the throughput.

DETAILED DESCRIPTION OF THE EMBODIMENTS

Embodiments of the invention will now be described more fully hereinafter with reference to the accompanying drawings, in which embodiments of the invention are shown.

The following description of the embodiments with reference to the attached drawings, the present invention can be used to illustrate specific embodiments to implement. Furthermore, the present invention is referred to the direction of the terminology, such as "upper", "lower", "top", "bottom", "front", "rear", "Left", "Right", "inside", "outside", "side" etc., with reference to the accompanying drawings, only the direction. Therefore, the use of directional terms are used to describe and understand the present invention and not intended to limit the present invention.

Figure 3:
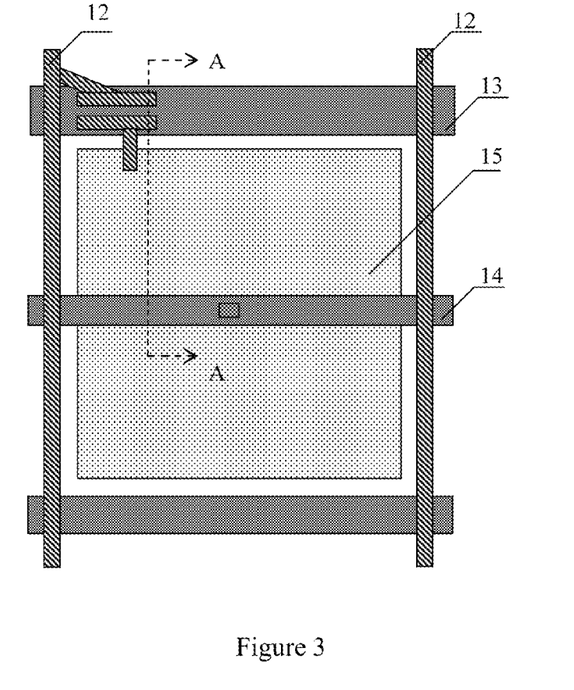
FIG. 3 is a schematic view showing the pixel structure of the liquid crystal device in accordance with one embodiment.
Figure 4:
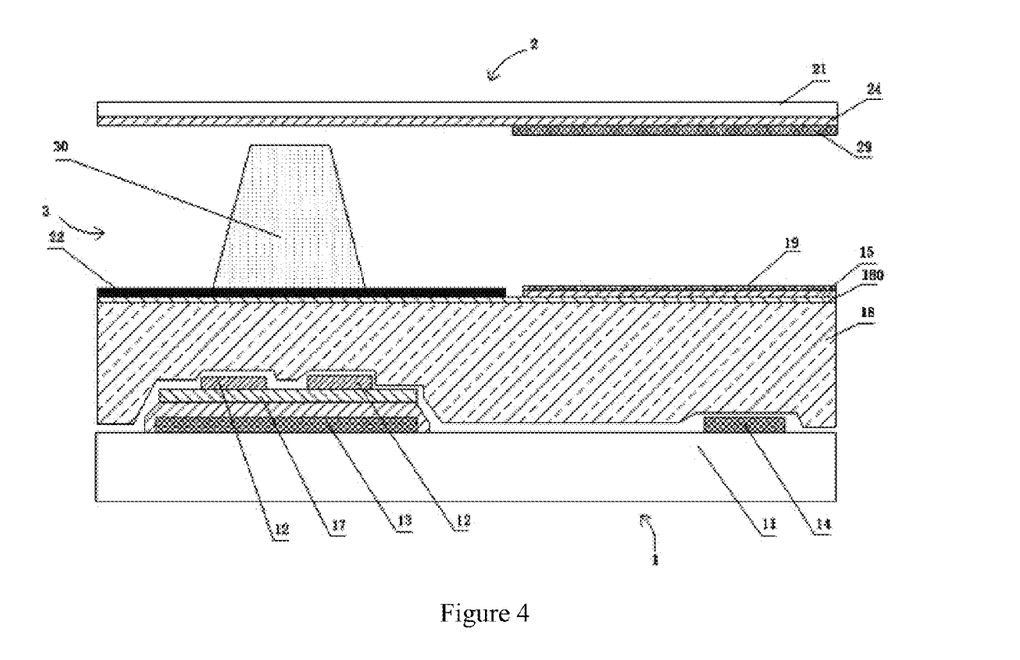
FIG. 4 is a section view of the liquid crystal device along the A-A line of FIG. 3 in accordance with one embodiment.

FIGS. 3 and 4 are schematic view showing the structure of the liquid crystal device in accordance with one embodiment. The liquid crystal device includes a TFT array substrate 1, a color filter (CF) substrate 2, and a liquid crystal layer 3.

The TFT array substrate 1 includes a first electrode layer 15, a first alignment layer 19 covering the first electrode layer 15. ACF layer 18 is formed between a glass substrate 11 and a passivation layer 180 of the TFT array substrate. In addition, the TFT array substrate 1 includes a black matrix 22 and a photo spacer 30.

The CF substrate 2 includes a second electrical layer 24 and a second alignment layer 29.

The liquid crystal cell is arranged between the first alignment layer 19 of the TFT array substrate 1 and the second alignment layer 29 of the CF substrate 2.

Both of the first alignment layer 19 and the second alignment layer 29 are divided into at least one subarea, and each of the subareas is divided into a plurality of alignment areas. The predetermined alignment direction of the alignment area of the first alignment layer 19 is vertical to that of the second alignment layer 29.

The polarized beams with different directions respectively radiates on the first alignment layer 19 and the second alignment layer 29. The polarized direction of the polarized beams radiating on each of the alignment areas adapts to the alignment directions such that the alignment films having the predetermined alignment direction corresponding to each of the alignment area are formed on the first alignment layer 19 and the second alignment layer 29.

The alignment principle and process regarding the first alignment layer and the second alignment layer will be described hereinafter.

Figure 5:
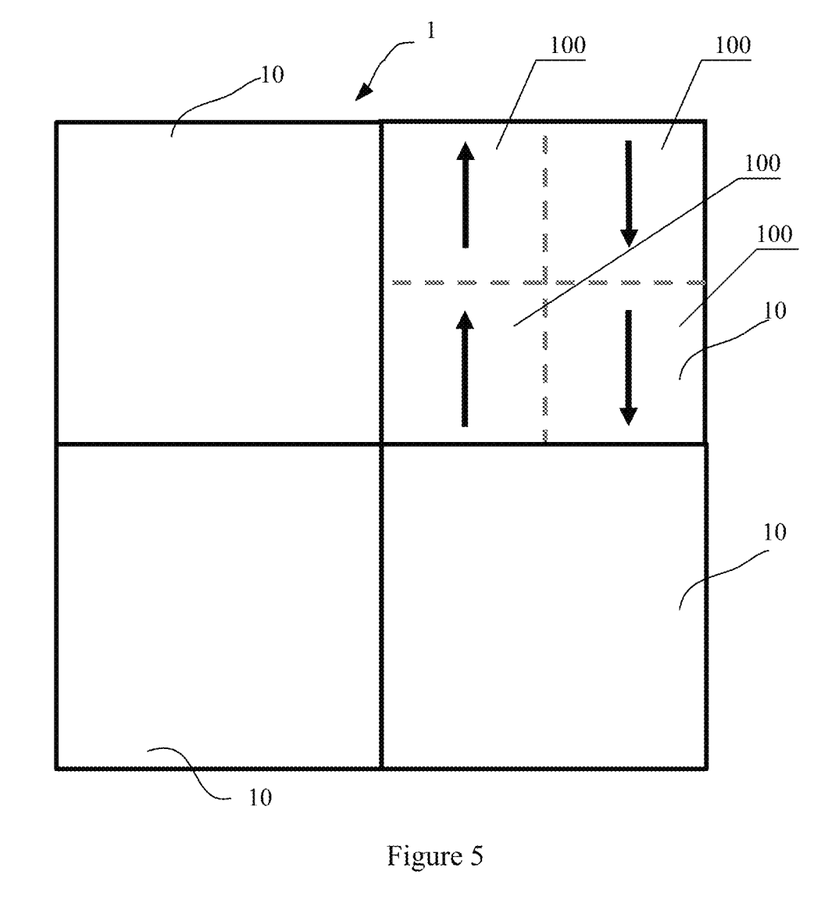
FIG. 5 is a schematic view showing the subareas of the TFT array substrate in accordance with the first embodiment.

FIGS. 5-8 show the first embodiment. In the first embodiment as shown in FIG. 5, the first alignment layer of the TFT array substrate 1 is divided to a plurality of subareas 10. Each of the subareas 10 further includes a plurality of alignment areas 100. In FIG. 5, only one subareas 10 divided into four alignment areas by two separating lines vertical to each other is shown as one example. Each of the alignment areas 100 includes a predetermined alignment direction as indicated by the arrow. As shown, the alignment directions of at least two alignment areas 100 within one subareas 10 is different. The predetermined alignment directions of the two alignment areas 100 located on the left side is upward, and the predetermined alignment directions of the two alignment areas 100 located on the right side is downward.

Figure 6:
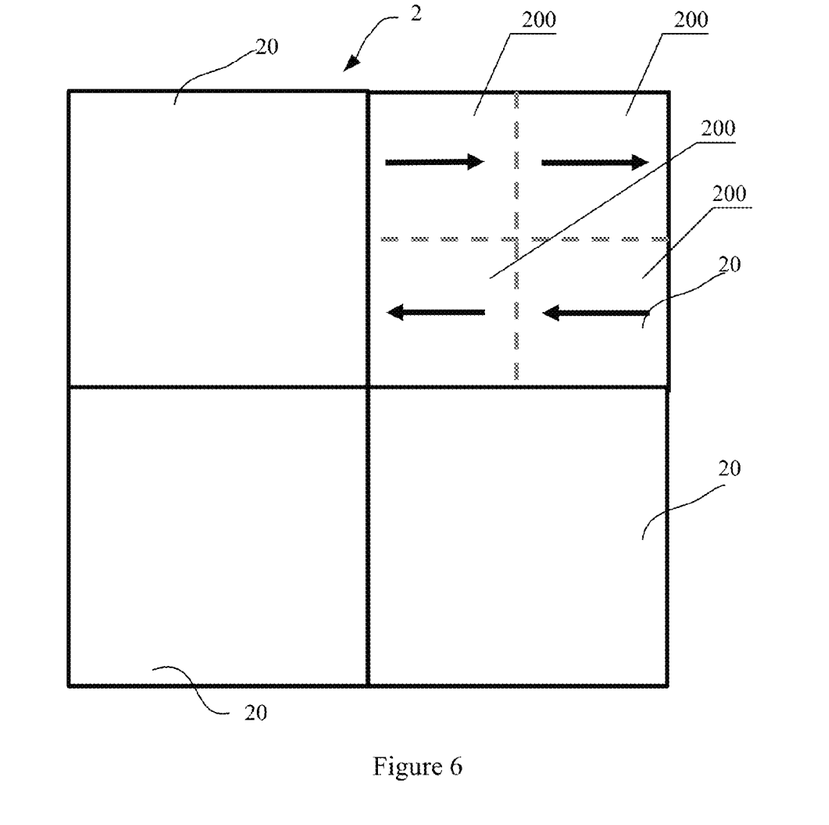
FIG. 6 is a schematic view showing the subareas of the CF substrate of the liquid crystal device in accordance with the first embodiment.

Similarly, as shown in FIG. 6, the second alignment layer of the CF substrate 2 is divided into a plurality of subareas 20. Each of the subareas 20 further includes a plurality of alignment areas 200. As shown in FIG. 6, each of the subareas 20 is divided into four alignment areas 200 by two separating lines vertical to each other. Each of the alignment areas 200 is configured with a predetermined direction as indicated by the arrow. The alignment directions of at least two alignment areas 200 within one subareas 20 is different. The predetermined alignment directions of the two alignment areas 200 located on the up side is rightward, and the predetermined alignment directions of the two alignment areas 200 located on the down side is leftward.

The predetermined alignment direction of each of the alignment areas 100 of the first alignment layer is vertical to that of the alignment areas 200 of the second alignment layer.

Figure 7:
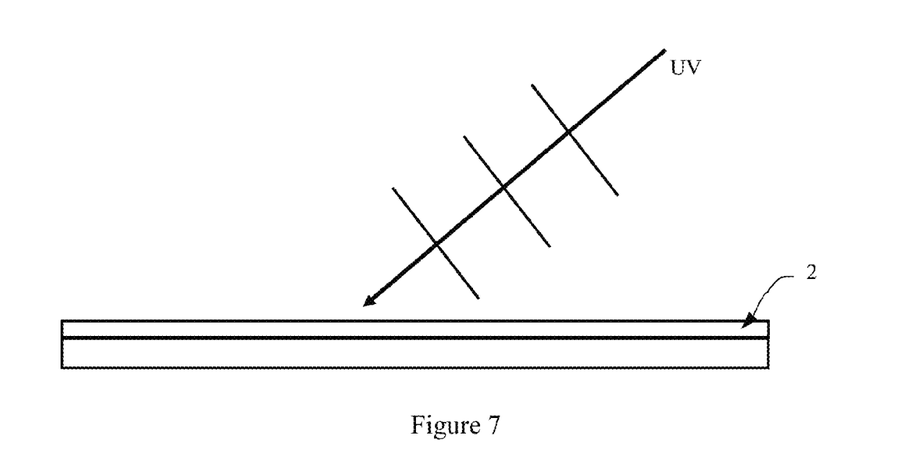
FIG. 7 is a schematic view showing the CF substrate being radiated by polarized beams in accordance with the embodiment.

FIG. 7 is a schematic view showing the substrate being radiated by the polarized beams. The polarized beams adopt ultraviolet (UV) rays. FIG. 7 shows the alignment area 200 located on the down side of one subarea 20 of the second alignment layer of the CF substrate 2 of FIG. 6 being radiated by the UV rays. The direction indicated by the arrow is the radiating direction of the polarized beams. The black lines vertical to the radiating direction is the polarized direction of the polarized beams. In the embodiment, the polarized direction of the polarized beams has to adapt to, or the same with, the predetermined alignment direction of the alignment areas 200 of the subarea 20 of the second alignment layer. As such, the alignment film with the predetermined alignment direction is formed within the alignment area 200 via the polarized beams radiation.

Similarly, it is needed to adopt polarized beams with different directions to radiate other alignment areas 200 within the subareas 20 of the second alignment layer so as to form the alignment film with predetermined alignment direction on the second alignment layer. At the same time, each of the alignment areas 100 of the subareas 10 has to be radiated by the polarized beams so as to form the alignment film with predetermined alignment direction on the first alignment layer.

Figure 8:
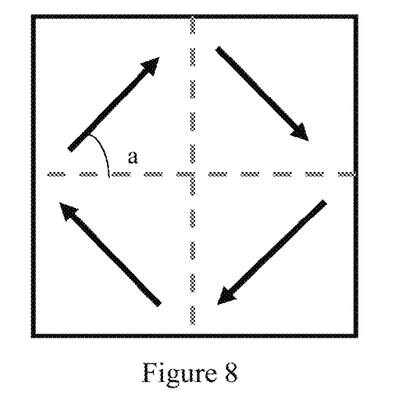
FIG. 8 is a schematic view showing the alignment result of the liquid crystal in accordance with the first embodiment.

FIG. 8 is a schematic view showing the alignment result of the liquid crystal of liquid crystal device in accordance with the first embodiment. After the alignment layer is formed, the first electrode of the TFT array substrate and the second electrode of the CF substrate are electrified so as to align the liquid crystal molecules within the liquid crystal cell. As the predetermined alignment direction of each of the alignment areas 100 of the first alignment layer is vertical to that of the corresponding alignment areas 200 of the second layer, the liquid crystal molecules corresponding to each of the alignment areas within the liquid crystal cell are reversed due to the first alignment layer and the second alignment layer so as to finish the alignment process. FIG. 8 is a schematic view showing the alignment of the liquid crystal molecules corresponding to one subarea of FIGS. 5 and 6. In the end, the liquid crystal molecules in the third dimension and the x axis form an angle equaling to "a" degree. The liquid crystal molecules in the first dimension and the x axis form an angle equaling to "−a" degree. The liquid crystal molecules in the second dimension and the x axis form an angle equaling to "(a−180)" degree. The liquid crystal molecules in the fourth dimension and the x axis form an angle equaling to "(180−a)" degree. As such, the color shift issue at wide viewing angle is enhanced. The alignment process of liquid crystal molecules for other subareas is conducted in a similar way.

Figure 9:
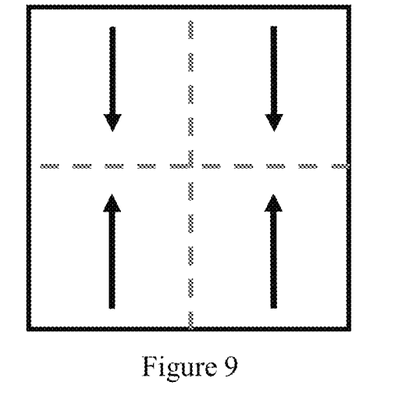
FIG. 9 is a schematic view showing the subareas of the TFT array substrate in accordance with the second embodiment.
Figure 10:
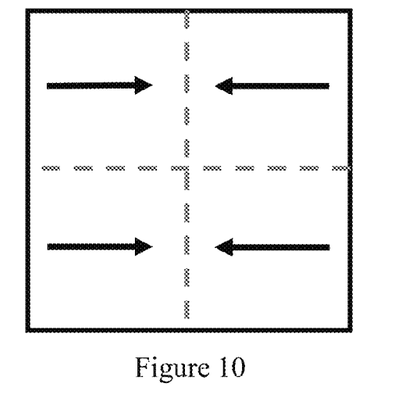
FIG. 10 is a schematic view showing the subareas of the CF substrate of the liquid crystal device in accordance with the second embodiment.
Figure 11:
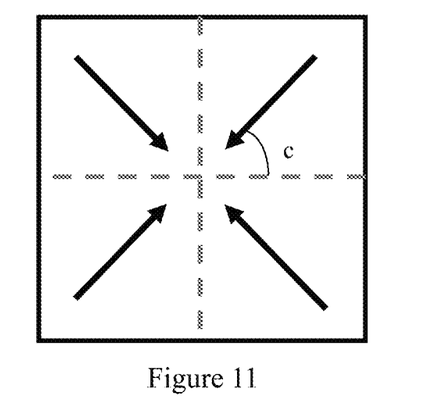
FIG. 11 is a schematic view showing the alignment result of the liquid crystal in accordance with the second embodiment.

FIGS. 9 to 11 show a second embodiment. In the embodiment, for one subareas 10 of the first alignment layer of the TFT array substrate 1, the predetermined alignment direction of the two alignment areas 100 located in the up portion is downward, and the predetermined alignment direction of the two alignment areas 100 located in the down portion is upward. For the corresponding subareas 20 of the second alignment layer of the CF substrate 2, the predetermined alignment direction of the alignment areas 200 located in the right portion is leftward, and the predetermined alignment direction of the alignment areas 200 located in the left portion is rightward. In the end, as shown in FIG. 11, the liquid crystal molecules of the corresponding areas of the liquid crystal device head toward a central location, and the liquid crystal molecules in the first dimension and the x axis form an angle equaling to "c" degrees.

Figure 12:
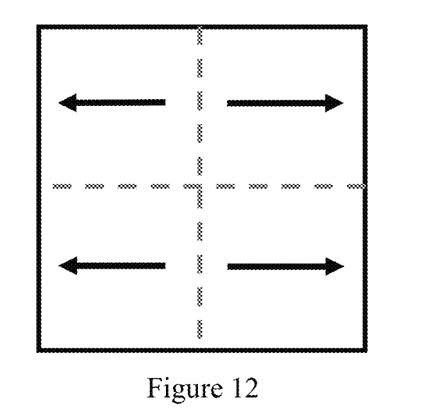
FIG. 12 is a schematic view showing the subareas of the TFT array substrate in accordance with the third embodiment.
Figure 13:
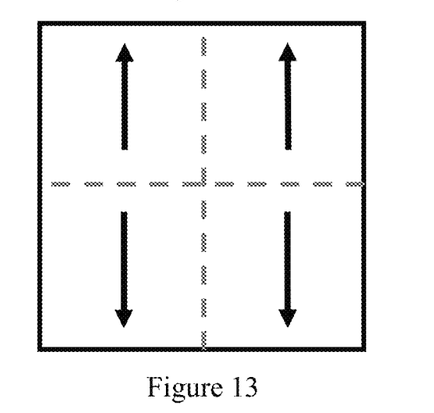
FIG. 13 is a schematic view showing the subareas of the CF substrate of the liquid crystal device in accordance with the third embodiment.
Figure 14:
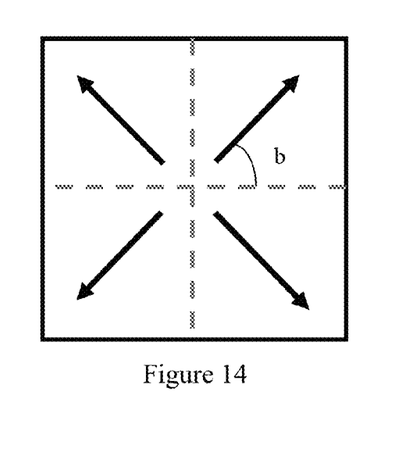
FIG. 14 is a schematic view showing the alignment result of the liquid crystal in accordance with the third embodiment.

FIGS. 12 to 14 show the third embodiment. In the embodiment, for one subarea 10 of the first alignment layer of the TFT array substrate 1, the predetermined alignment direction of the two alignment areas 100 located in the right portion is rightward, and the predetermined alignment direction of the two alignment areas 100 located in the left portion is leftward. For the corresponding subareas 20 of the second alignment layer of the CF substrate 2, as shown in FIG. 14, the predetermined alignment direction of the alignment areas 200 located in the up portion is upward, and the predetermined alignment direction of the alignment areas 200 located in the down portion is downward. The x axis form an angle equaling to "b" degrees.

It can be understood that the above three embodiments are examples. In other embodiments, the predetermined alignment direction of the alignment areas of the subareas of the first alignment layer may be configured accordingly. Similarly, the predetermined alignment direction of the corresponding alignment areas of the second alignment layer may be adaptably configured.

In one embodiment, the first electrode layer 15 is the pixel electrode layer, and the second electrical layer 24 is the common electrode layer. The dimension and location of each of the subareas of the alignment layer may be configured to be corresponding to that of one pixel structure of the TFT array substrate 1.

The structure of the liquid crystal device will be described hereinafter. As shown in FIGS. 3 and 4, the TFT array substrate 1 further includes the glass substrate 11, a gate line 13 and a common electrode 14. A semiconductor layer 17 is arranged above the gate line 13. A data line 12 is arranged on the semiconductor layer 17 for forming a gate and a source, and a passivation layer 180 arranged on the data line 12. A pixel electrode 15 is formed on the passivation layer 180. The first alignment layer 19 is arranged above the pixel electrode 15.

The CF layer 18 is arranged between the glass substrate 11 of the TFT array substrate 1 and the passivation layer 180 such that the up and down surfaces of the liquid crystal cells (liquid crystal layer) are processed to be flat. Usually, the CF layer 18 may operate as the insulation layer if an appropriate material is selected to be the CF material. As such, the insulation layer arranged on the up and down surfaces of the CF layer 18 may be omitted, which not only reduces the cost but also enhance the throughput. The CF materials includes bone glue, acrylic, polyimide, and polyester.

The CF substrate 2 includes a glass substrate 21, and a common electrode 24 covering the glass substrate 21. The second alignment layer 29 is arranged above the common electrode 24.

The liquid crystal cell 3 includes liquid crystal molecules (not shown) and a photo spacer 30.

In the embodiment, in order to prevent the TFT array substrate 1 and the CF substrate 2 from reduced aperture rate of the pixel areas due to dislocation, a black matrix 22 is arranged on the TFT array substrate.

As shown in FIG. 4, in the embodiment, the black matrix 22 is arranged above the passivation layer 180 of the TFT array substrate 1, and no black matrix 22 is arranged on the CF substrate 2.

Figure 15:
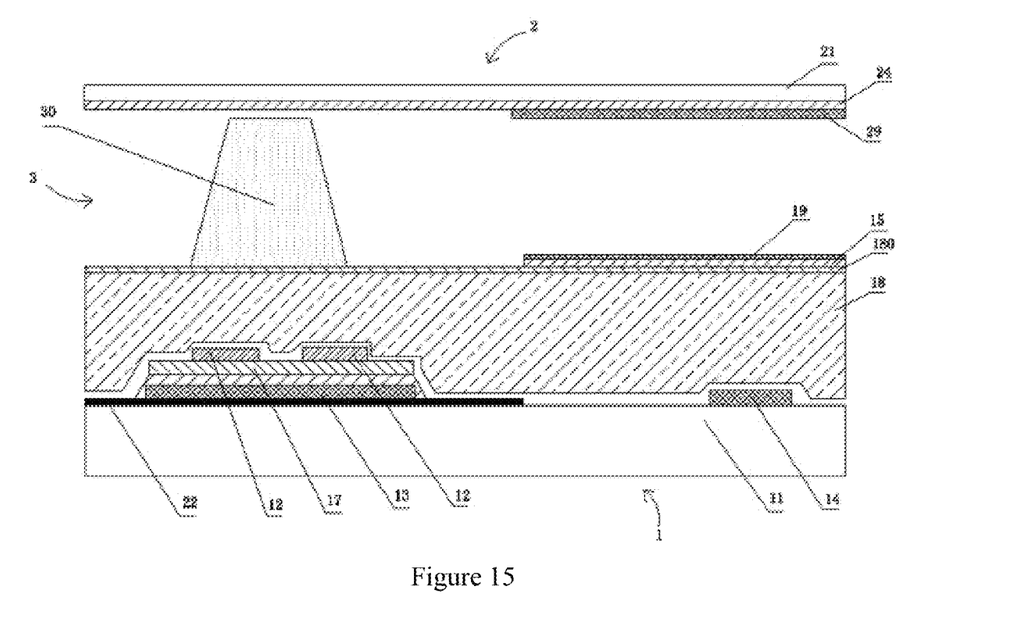
FIG. 15 is a section view of the liquid crystal display device in accordance with another embodiment.

FIG. 15 is a section view of the liquid crystal display device in accordance with another embodiment. The difference between FIG. 15 and FIG. 4 resides in that the black matrix 22 is arranged above the glass substrate 11 of the TFT array substrate 1, and is arranged below the gate line 13. No black matrix 22 is arranged on the CF substrate 2. Other structures of this embodiments are the same with those shown in FIG. 4.

Figure 16:
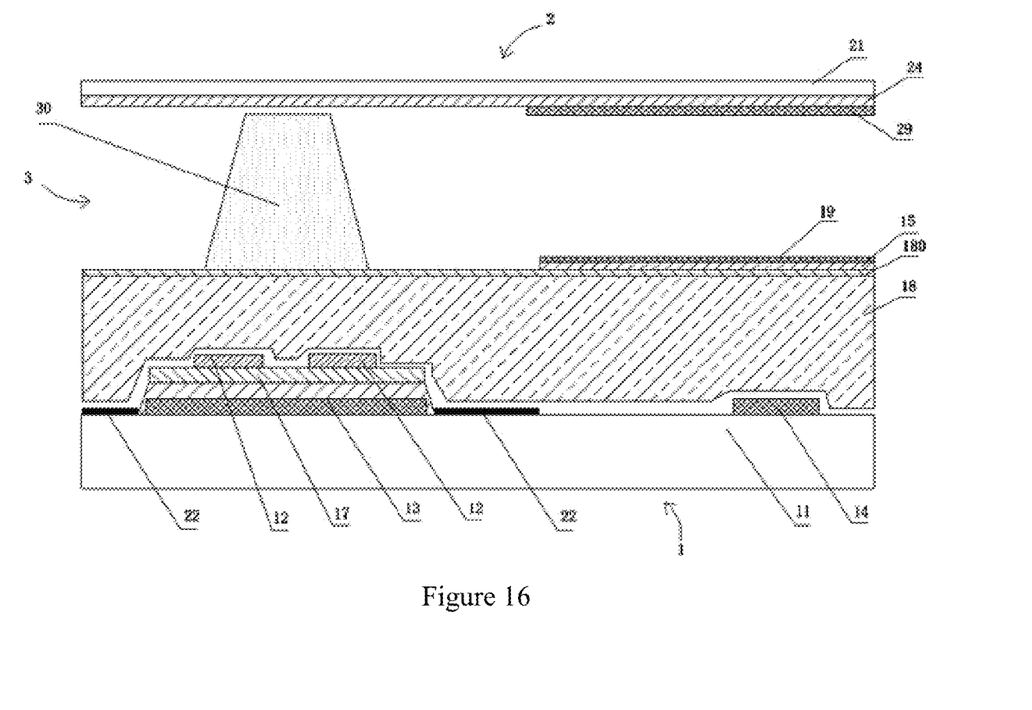
FIG. 16 is a section view of the liquid crystal display device in accordance with another embodiment.

FIG. 16 is a section view of the liquid crystal display device in accordance with another embodiment. The difference between FIG. 16 and FIG. 4 resides in that the black matrix 22 is arranged above the glass substrate 11 of the TFT array substrate 1, and is arranged on two lateral sides of the gate line 13. No black matrix 22 is arranged on the CF substrate 2. Other structures of this embodiments are the same with those shown in FIG. 4.

It can be understood that in other embodiments, the black matrix 22 may be arranged on other locations on the TFT array substrate 1. For example, the black matrix 22 is arranged between the CF layer 18 of the TFT array substrate 1 and the data line 12. The location of the black matrix 22 can be referenced in the above descriptions.

Referring to FIGS. 4, 15, and 16, the photo spacer 30 is arranged on the TFT array substrate 1. Specifically, the photo spacer 30 is arranged above the black matrix 22 in FIG. 4. The photo spacer 30 is arranged above the passivation layer 180 in FIGS. 15 and 16. The photo spacer 30 is arranged on the TFT array substrate 1 to avoid the disclination line happen in the pixel area due to the dislocation of the CF substrate 2 and the TFT array substrate 1. As the photo spacer 30 has a greater height, the flatness within the liquid crystal cell may be affected and thus results in a bad alignment. Generally, the photo spacer 30 is arranged to be spaced apart from the display area for a certain distance. If the photo spacer 30 is arranged on the CF substrate 2, the photo spacer 30 may enter the display area of the TFT array substrate 1 due to the dislocation between the CF substrate 2 and the TFT array substrate 1, which causes the bad alignment. The photo spacer 30 may abut against the CF substrate 2 or may be arranged to be spaced apart from the CF substrate 2 for a certain distance.

Figure 17:
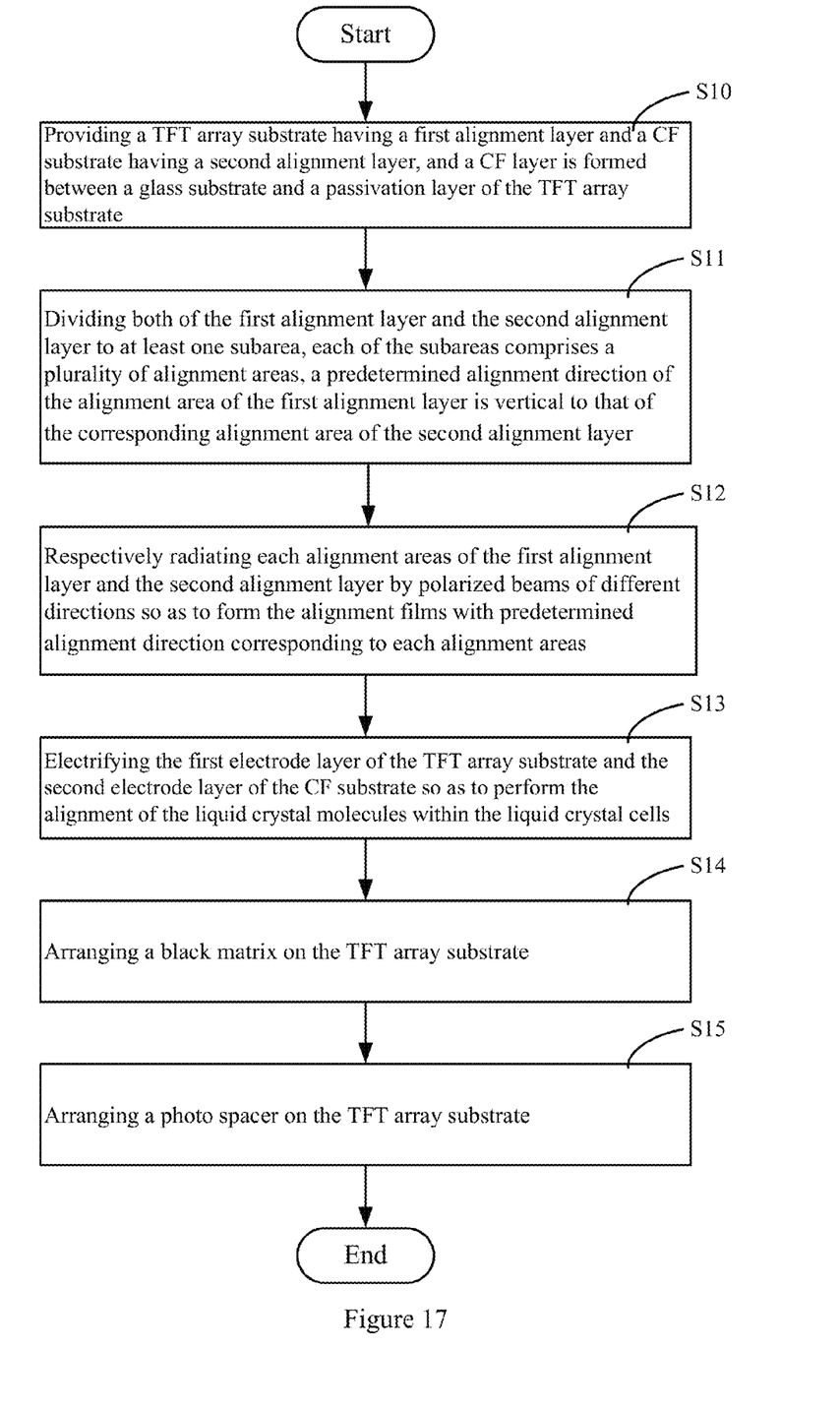
FIG. 17 is a flowchart showing the manufacturing method of the liquid crystal device in accordance with one embodiment.

In view of the above alignment principle, process, and the structure of the liquid crystal device, the claimed invention further includes a manufacturing method of the liquid crystal device. FIG. 17 is a main flowchart showing the manufacturing method of the liquid crystal device in accordance with one embodiment. The manufacturing method includes the following step.

In step S10, a TFT array substrate and a CF substrate are provided. A CF layer is formed between the glass substrate and the passivation layer of the TFT array substrate. A first alignment layer is formed by coating polarization-beam-sensitive material on a first electrode layer of the TFT array substrate. A second alignment layer is formed by coating polarization-beam-sensitive material on a first electrode layer of the CF substrate.

In step S11, both of the first alignment layer and the second alignment layer are divided to at least one subarea. Each of the subarea includes a plurality of alignment areas. The alignment direction of the alignment area of the first alignment layer is vertical to that of the corresponding alignment area of the second alignment layer.

In step S12, the alignment areas of the first alignment layer and the second alignment layer are radiated by polarized beams of different directions. The polarized direction of the polarized beams radiating on each of the alignment areas adapts to the alignment direction so as to form the alignment films with predetermined alignment directions corresponding to each of the alignment areas.

In step S13, the first electrode layer of the TFT array substrate and the second electrode layer of the CF substrate are electrified so as to perform the alignment of the liquid crystal molecules within the liquid crystal cells.

In step S14, the black matrix is arranged on the TFT array substrate.

Specifically, in step S14, the black matrix is arranged is arranged above the passivation layer of the TFT array substrate. Alternatively, the black matrix is arranged above the glass substrate of the TFT array substrate and is arranged below the gate line. Alternatively, the black matrix is arranged above the glass substrate of the TFT array substrate and is arranged on two lateral sides of the gate line. Alternatively, the black matrix may be arranged in other locations of the TFT array substrate. For example, the black matrix is arranged between the CF layer and the data line of the TFT array substrate.

In step S15, the photo spacer is arranged on the TFT array substrate.

Specifically, in step S14, the black matrix is arranged is arranged above the passivation layer of the TFT array substrate. Alternatively, the black matrix is arranged above the glass substrate of the TFT array substrate and is arranged below the gate line. Alternatively, the black matrix is arranged above the glass substrate of the TFT array substrate and is arranged on two lateral sides of the gate line. Alternatively, the black matrix may be arranged in other locations of the TFT array substrate. For example, the black matrix is arranged between the CF layer and the data line of the TFT array substrate.

In step S15, the photo spacer is arranged above the black matrix. Alternatively, the photo spacer may be arranged above the passivation layer of the TFT array substrate.

By disposing the CF layer within the TFT array substrate, the up and down surfaces of the liquid crystal cells are processed to be flat so as to obtain better alignment in step S13. In addition, by selecting appropriate CF layer material, the CF layer may operate as the insulation layer. As such, the insulation layer arranged on the up and down surfaces of the CF layer 18 may be omitted, which not only reduces the cost but also enhance the throughput. The CF materials includes bone glue, acrylic, polyimide, and polyester.

In one embodiment, the first electrode layer 15 is the pixel electrode layer. The second electrode layer is the common electrode layer. The dimension and location of each of the subareas of the alignment layer may be configured to be corresponding to that of one pixel structure of the TFT array substrate.

The alignment principle and the process of the first alignment layer and the second alignment layer may be referenced to descriptions regarding FIGS. 5-14.

First, the polarized beams with different directions are adopted to radiate on the first alignment layer of the TFT array substrate and the second alignment layer of the CF substrate to form the alignment layer with specific alignment direction. As a result, it is not needed to design the pixel electrode, which avoids the light and dark strips caused by pixel electrodes. Also, the transmission rate of light beams is enhanced.

Second, the predetermined alignment direction of each alignment areas of each subareas of first alignment layer and that of the second alignment layer may be flexibly configured so as to achieve alignment for four areas of each pixel structure of the liquid crystal cells. At the same time, the color shift issue at wide viewing angle is enhanced.

Third, the black matrix arranged on the TFT array substrate is for preventing the TFT array substrate and the CF substrate from reduced aperture rate of the pixel areas due to dislocation.

Fourth, the photo spacer arranged on the TFT array substrate is for preventing the disclination line in the pixel areas due to the dislocation of the TFT array substrate and the CF substrate.

Fifth, by selecting appropriate CF layer material, the CF layer may operate as the insulation layer. As such, the insulation layer arranged on the up and down surfaces of the CF layer 18 may be omitted, which not only reduces the cost but also enhance the throughput.

In addition, by arranging the CF layer on the TFT array substrate, the up and down surfaces of the liquid crystal cells are processed to be flat so as to obtain better liquid crystal alignment.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal device, comprising:
   a TFT array substrate comprising a first electrode layer and a first alignment layer covering the first electrode layer, a color film (CF) layer is formed between a glass substrate and a passivation layer of the TFT array substrate, and the TFT array substrate comprises a black matrix and a photo spacer arranged thereon;
   a CF substrate comprising a second electrode layer and a second alignment layer covering the second electrode layer;
   a liquid crystal layer arranged between the first alignment layer of the TFT array substrate and the second alignment layer of the CF substrate;
   wherein both of the first alignment layer and the second alignment layer are divided into at least one subarea, and each of the subareas is divided into a plurality of alignment areas, and a predetermined alignment direction of the alignment area of the first alignment layer is vertical to that of the second alignment layer; and
   each alignment areas of the first alignment layer and the second alignment layer are radiated by polarized beams with different directions, polarized directions of the polarized beams radiating on each of the alignment areas adapts to the alignment directions such that alignment films having the predetermined alignment direction corresponding to each of the alignment area are formed on the first alignment layer and the second alignment layer.

2. The liquid crystal device as claimed in claim 1, wherein the TFT array substrate further comprises the glass substrate, a gate line, a semiconductor layer, and a data line.

3. The liquid crystal device as claimed in claim 2, wherein the black matrix is arranged above the passivation layer of the TFT array substrate, or is arranged above the glass substrate of the TFT array substrate and below the gate line, or is arranged above the glass substrate of the TFT array substrate and arranged on two lateral sides of the gate line, or is arranged between the CF layer and the data line of the TFT array substrate.

4. The liquid crystal device as claimed in claim 3, wherein the photo spacer is arranged above the black matrix, or is arranged above the passivation layer of the TFT array substrate.

5. The liquid crystal device as claimed in claim 1, wherein the CF layer is made by any one of bone glue, acrylic, polyimide, and polyester.

6. The liquid crystal device as claimed in claim 1, wherein each subareas is divided into four alignment areas by two separating lines vertical to each other, and at least two out of the four alignment areas have different alignment directions.

7. The liquid crystal device as claimed in claim 1, wherein the first electrode layer is a pixel electrode layer, and the second electrical layer is a common electrode layer.

8. A liquid crystal device, comprising:
   a TFT array substrate comprising a first electrode layer and a first alignment layer covering the first electrode layer, a color film (CF) layer is formed between a glass substrate and a passivation layer of the TFT array substrate, and the TFT array substrate comprises a black matrix and a photo spacer arranged thereon;

a CF substrate comprising a second electrode layer and a second alignment layer covering the second electrode layer;

a liquid crystal layer arranged between the first alignment layer of the TFT array substrate and the second alignment layer of the CF substrate;

wherein both of the first alignment layer and the second alignment layer are divided into at least one subarea, and each of the subareas is divided into a plurality of alignment areas, a predetermined alignment direction of the alignment area of the first alignment layer is vertical to that of the second alignment layer, each subareas is divided into four alignment areas by two separating lines vertical to each other, and at least two out of the four alignment areas have different alignment directions; and each alignment areas of the first alignment layer and the second alignment layer are radiated by polarized beams with different directions, polarized directions of the polarized beams radiating on each of the alignment areas adapts to the alignment directions such that alignment films having the predetermined alignment direction corresponding to each of the alignment area are formed on the first alignment layer and the second alignment layer.

9. A manufacturing method of liquid crystal devices, comprising:

providing a TFT array substrate and a CF substrate, forming a CF layer between a glass substrate and a passivation layer of the TFT array substrate, coating polarization-beam-sensitive material on a first electrode layer of the TFT array substrate to form a first alignment layer, and coating polarization-beam-sensitive material on a second electrode layer of the CF substrate to form a second alignment layer;

dividing both of the first alignment layer and the second alignment layer to at least one subarea, each of the subareas comprises a plurality of alignment areas, a predetermined alignment direction of the alignment area of the first alignment layer is vertical to the predetermined alignment direction of the corresponding alignment area of the second alignment layer; and radiating each alignment areas of the first alignment layer and the second alignment layer by polarized beams of different directions, and a polarized direction of the polarized beams radiating on each alignment areas adapts to the alignment direction so as to form the alignment films with predetermined alignment direction corresponding to each alignment areas;

electrifying the first electrode layer of the TFT array substrate and the second electrode layer of the CF substrate so as to finish the alignment of the liquid crystal molecules;

arranging a black matrix on the TFT array substrate; and arranging a photo spacer on the TFT array substrate.

10. The manufacturing method as claimed in claim 9, wherein the TFT array substrate further comprises the glass substrate, a gate line, a semiconductor layer, and a data line.

11. The manufacturing method as claimed in claim 10, wherein the black matrix is arranged above the passivation layer of the TFT array substrate, or is arranged above the glass substrate of the TFT array substrate and below a gate line, or is arranged above the glass substrate of the TFT array substrate and arranged on two lateral sides of the gate line, or is arranged between a CF layer and a data line of the TFT array substrate.

12. The manufacturing method as claimed in claim 9, wherein the photo spacer is arranged above the black matrix, or is arranged above the passivation layer of the TFT array substrate.

13. The manufacturing method as claimed in claim 12, wherein the CF layer is made by any one of bone glue, acrylic, polyimide, and polyester.

* * * * *